United States Patent [19]
Bundschuh et al.

[11] 3,858,828
[45] Jan. 7, 1975

[54] DRIVE MECHANISM FOR MOTION PICTURE PROJECTOR

[75] Inventors: John J. Bundschuh, Penfield; William L. Burnham; Kenneth W. Thomson, both of Rochester, all of N.Y.

[73] Assignee: Eastman Kodak Company, Rochester, N.Y.

[22] Filed: May 2, 1973

[21] Appl. No.: 356,699

[52] U.S. Cl................ 242/193, 242/205, 242/207, 352/156
[51] Int. Cl. ............................................. G03b 1/04
[58] Field of Search .......... 242/193, 194, 205, 207, 242/210, 71.2, 71.1, 199, 200, 198; 352/156

[56] References Cited
UNITED STATES PATENTS
1,310,211  7/1919  Philpot............................ 242/193

FOREIGN PATENTS OR APPLICATIONS
1,206,043  9/1970  Great Britain..................... 352/156

*Primary Examiner*—George F. Mautz
*Attorney, Agent, or Firm*—D. D. Shaper; W. H. J. Kline

[57] ABSTRACT

A drive mechanism for motion picture projectors wherein the take-up reel and the supply reel are mounted on a common axis and are driven by non-axially-movable unidirectionally rotating drive spindle shaft. Through appropriate clutching mechanisms movable axially relative to the spindle shaft, the take-up and supply reels are selectively driven by friction or positive drives in a manner to enable the projector to function in a forward mode, a fast forward mode, a reverse mode, or a rewind mode. A braking mechanism is provided to stop the rotation of the take-up and supply reels when it is desired to terminate the rewind or fast forward mode of operation with the power in the projector being simultaneously shut off.

10 Claims, 8 Drawing Figures

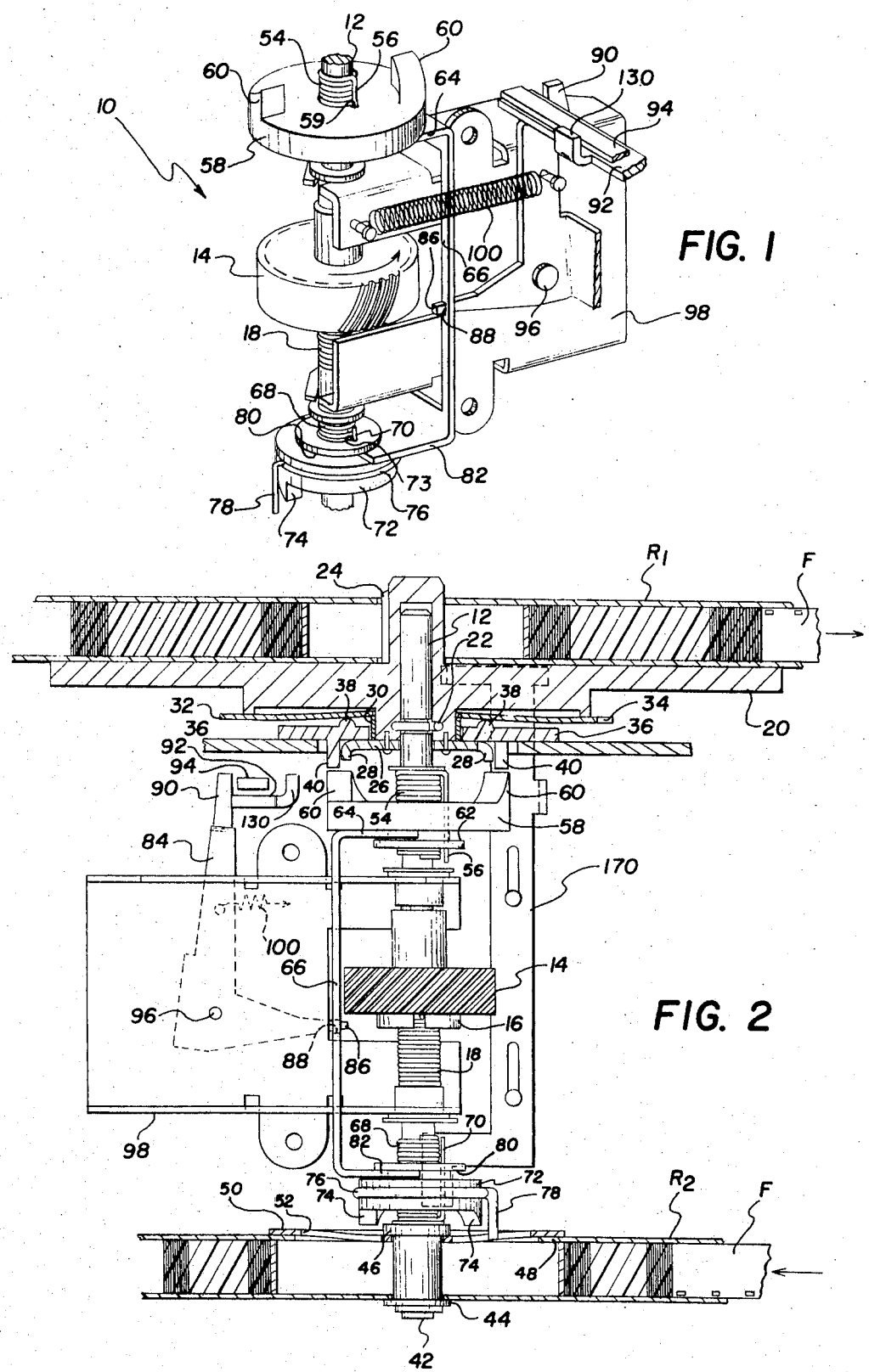

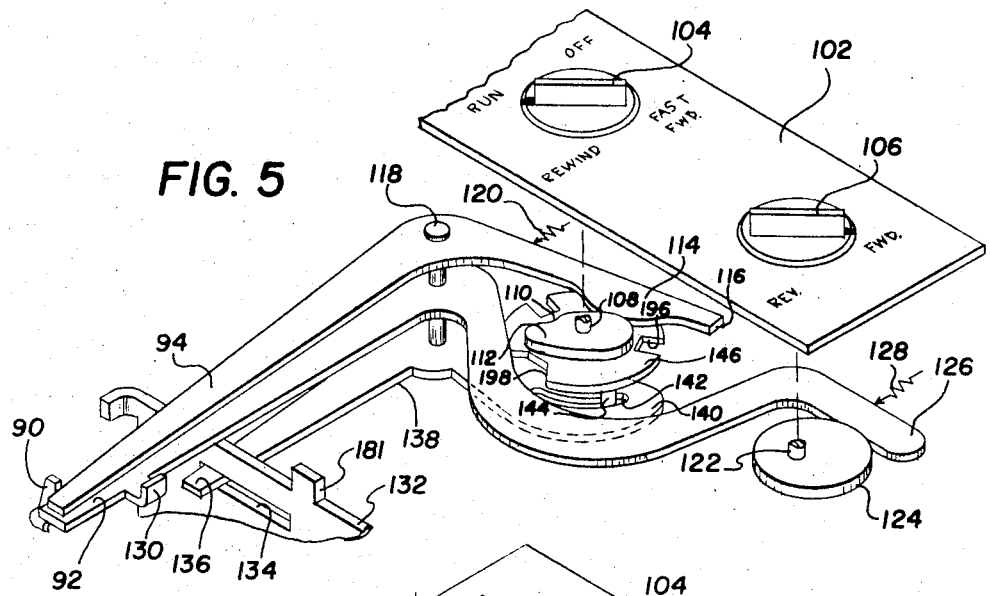
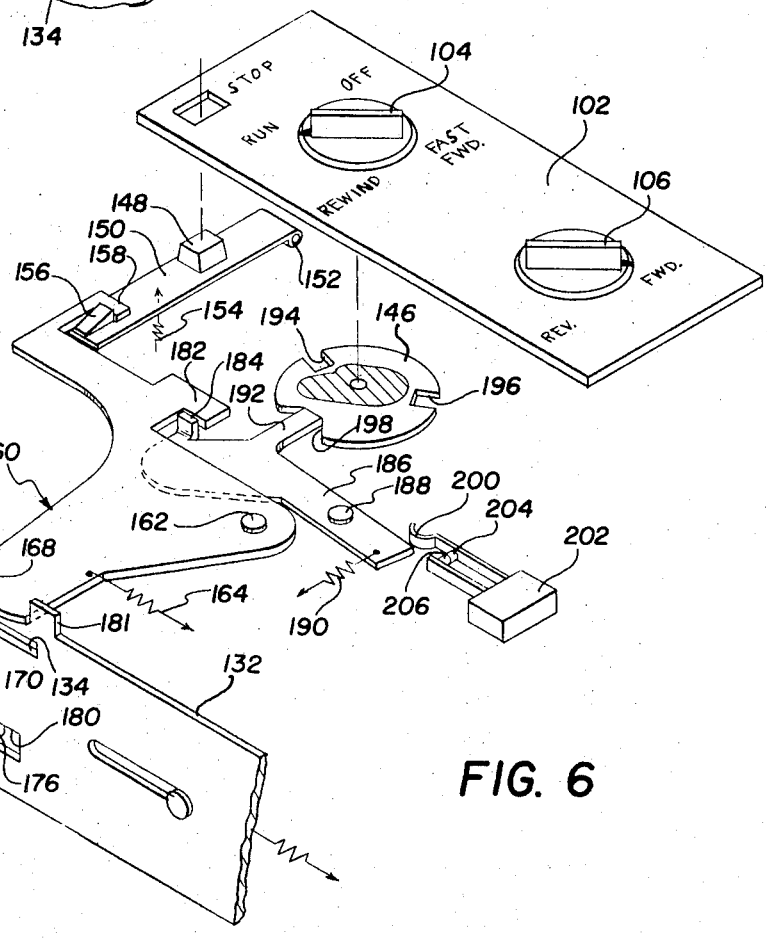

PATENTED JAN 7 1975

DRIVE MECHANISM FOR MOTION PICTURE PROJECTOR

CROSS REFERENCE TO RELATED APPLICATIONS

Reference is made to commonly assigned, copending U.S. Pat. application Ser. No. 315,052, entitled "SPRING CLUTCH/KEY," filed on Dec. 14, 1972 in the name of Kenneth W. Thomson and to commonly assigned, copending U.S. Pat. application Ser. No. 356,701, entitled "DOUBLE RELEASE FOR AUTOMATIC REWIND," filed on May 2, 1973 in the names of William L. Burnham and Kenneth W. Thomson.

BACKGROUND OF THE INVENTION

1. Field of the Invention

This invention relates to drive mechanisms for motion picture projectors and more particularly for a motion picture projector drive which can be set by axially moving clutch mechanisms to operate in a forward, fast forward, reverse or rewind mode of operation.

2. Description of the Prior Art

Modern motion picture projectors having drive mechanisms which are capable of providing both forward and reverse projection modes are well known as shown in U.S. Pat. No. 3,329, 365 and 3,468,498. These projectors are multiple spindle arrangements which require reversible motors or intricate pulley systems to achieve dual directional drive. An arrangement which simplifies the dual directional drive mechanisms of the above patents is shown in the British Pat. No. 1,206,043. In this British patent both the take-up and supply reels are mounted on a single spindle shaft, the shaft being driven in a specific rotational direction. By axially adjusting the position of the spindle shaft (and the take-up reel), the apparatus may be shifted to drive the take-up or supply reel for accomplishing forward or reverse drive. The axial shifting of the spindle shaft and the take-up reel introduces elements into the drive train necessary for transmitting power from a motor to an output member movable relative thereto. Additionally, in view of the fact that the take-up reel must funtion in several planes, provision must be made for handling the film at the take-up reel at the varying elevational planes of operation.

SUMMARY OF THE INVENTION

In view of the above, it is a primary object of this invention to provide a forward and reverse drive mechanism for a motion picture projector, the drive mechanism having a single non-axially-movable spindle shaft on which are mounted both the supply and take-up reels.

It is further an object of this invention to provide a motion picture drive mechanism wherein the supply reel and the take-up reel each operate in single reference planes on a non-axially-movable unidirectionally driven spindle shaft.

It is also an object of this invention to provide a motion picture drive mechanism capable of enabling the projector to function in a forward, fast forward, reverse, or rewind mode of operation.

Additionally, it is an object of this invention to provide a motion picture drive mechanism which has a brake control to stop the rotation of both the supply reel and the take-up reel when it is desired to terminate the rewind or fast forward mode of operation, there being a simultaneous power shut off in the projector.

Accordingly, there is herein provided a drive mechanism for a motion picture projector wherein a supply reel and a take-up reel are mounted on a common axis and are driven by a non-axially movable unidirectional rotationally driven spindle shaft. Clutch mechanisms mounted for axial movement on the spindle shaft are positioned by control of a clutch engaging slide to position the clutch mechanisms for appropriate engagement with the take-up reel or supply reel to provide either friction or positive drive thereto to enable the projector to function in a forward mode, a fast forward mode, a reverse mode or a rewind mode of operation. A brake slide is provided to selectively engage braking discs associated with the take-up reel and the supply reel when it is desired to terminate the rewind or fast forward mode of operation. Simultaneously with the actuation of the brake slide the power in the projector is shut off.

BRIEF DESCRIPTION OF THE DRAWINGS

FIG. 1 is a perspective view of the motion picture projector drive mechanism according to this invention including the clutch engaging slide and positioning lever therefor;

FIG. 2 is a side elevational view of the drive mechanism showing the various operating elements arranged to enable the projector to function in the forward mode of operation;

FIG. 5 is a perspective view of the control knobs for operational mode selection and associated minipulating levers;

FIG. 6 is a perspective view of the control knobs and the operating linkage for the braking mechanism according to this invention, the braking mechanism being shown in its cocked position during the run mode of operation of the projector;

DESCRIPTION OF THE PREFERRED EMBODIMENT

Projector Drive Mechanism

Figure 3:
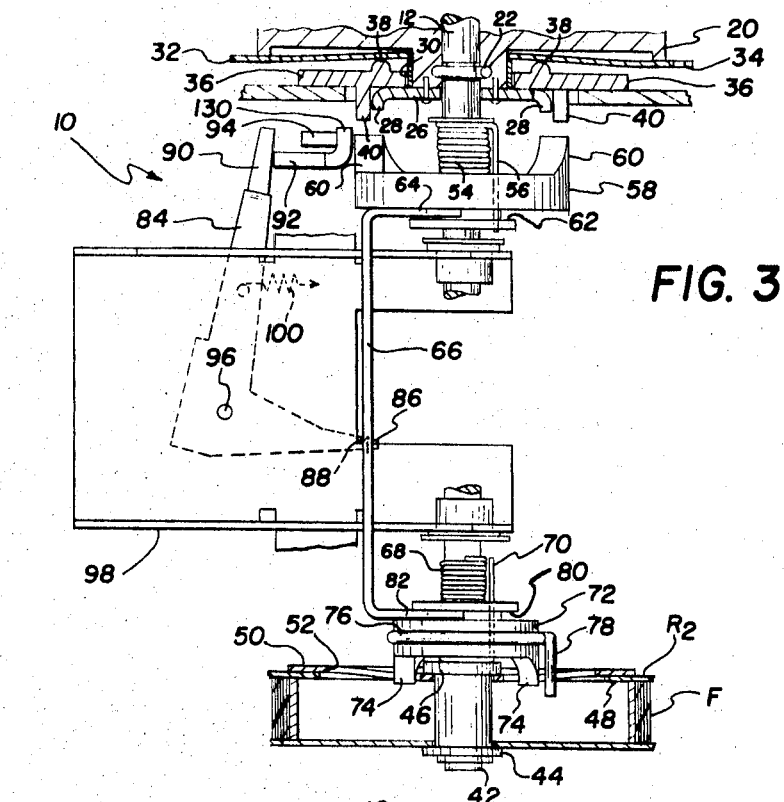
FIG. 3 is a side elevational view similar to that of FIG. 2 showing the operating elements arranged to enable the projector to function in the fast forward mode of operation.

Referring now to the drawings, FIG. 1 shows a motion picture projector drive mechanism 10 having a vertically oriented spindle shaft 12 upon which is mounted a helical drive gear 14 supported on a bearing 16. A drive motor (not shown) drives the gear 14 so as to rotate the spindle shaft 12 in a counterclockwise direction. The connection between the gear 14 and the spindle shaft 12 is accomplished by a spring clutch 18 which is selected to establish a normal driving function while permitting relative movement between the gear 14 and the shaft 12 to prevent damage to the projector motor if an overload on the shaft 12 occurs during operation of the projector. Mounted on the upper end of the spindle shaft 12 is an upper reel support 20 (see FIG. 2). The upper reel support 20 is connected to the shaft 12 by means of a split ring 22. This type of interconnection permits relative rotation between the upper reel support 20 and the shaft 12 while maintaining the relative axial positions thereof. The upper reel support 20 has a series of drive splines 24 for drivingly engaging a typical motion picture film reel R1. In the arrangement of the drive mechanism 10 according to this invention, the reel R1 is a supply reel from which film F is selectively withdrawn.

In order to provide for drive of the upper reel support 20, an upper reel drive plate 26 is fixed to the bottom thereof, the drive plate having a series of downwardly extending clutch teeth 28. Supported by the drive plate 26 is a sleeve 30 which surrounds a neck of the upper reel support 20 and supports an upper reel support brake plate 32. The brake plate 32 which is in frictional engagement with the upper reel support 20 has a series of notches 34 about the periphery thereof which are engaged in a manner to be described hereinbelow for the purpose of stopping rotation of the upper reel support. Also supported by the drive plate 26 and surrounding the sleeve 30 there is located a grounding plate 36 which has a series of friction pads 38 extending upwardly therefrom supportively engaging the brake plate 32. The grounding plate 36 has a series of clutch teeth 40 extending downwardly therefrom a distance greater than the distance which the clutch teeth 28 extend from the drive plate 26.

To provide support for a lower reel, at the lower end of the spindle shaft 12 there is mounted a spool 42 having opposed flanges 44 and 46. The flange 44 supports a lower reel R2 which selectively serves as a take-up reel for the film F from the upper reel R1. Connected to the flange 48 of the lower reel R2 and in frictional engagement with the flange 46 is a lower reel brake plate 50 which has a series of openings 52 extending therethrough which are engaged in a manner to be described hereinbelow for the purpose of stopping rotation of the lower reel.

Mounted on the spindle shaft 12 between the helical drive gear 14 and the upper reel drive plate 26 is a first spring clutch 54. The spring clutch 54 has a downwardly turned end portion 56 extending along the length thereof forming a key as fully described in the aforementioned U.S. application Ser. No. 315,052. An upper reel drive member 58 is mounted for axial movement on the shaft 12 about the first spring clutch 54. The drive member 58 has a keyway 59 which permits passage of the end portion 56 therethrough to provide friction drive between shaft 12 and drive member 58 while permitting relative axial movement therebetween. On the upper surface of the drive member 58 there is a series of drive teeth 60 for selective engagement with the clutch teeth 40 or 28 of the grounding plate 36 or upper reel drive 26 plate respectively. A groove 62 about the periphery of the drive member 58 is engaged by an upper tongue 64 of a drive member engaging slide 66 for axially positioning the drive member 58 to its desired drive position as will be fully explained hereinbelow.

A second spring clutch 68 having an upwardly turned end portion 70 extending along the length thereof is mounted on the spindle shaft 12 between the helical gear 14 and the spool 42. A lower drive reel member 72 is mounted on the spindle shaft 12 to surround the second spring clutch 68 and has a keyway 73 permitting the passage of the end portion 70 which serves as a key to guide the axial movement of the drive member 72 while imparting frictional drive thereto. The drive member 72 has a series of drive teeth 74 extending downwardly therefrom for selective engagement with the openings 52 in the lower reel brake plate 50. A groove 80 is also provided in the drive member 72, the groove 80 having retained therein a lower tongue 82 of the drive member engaging slide 66, for axially positioning the drive member 72 to its desired drive position as described hereinbelow. Surrounding the drive member 72 is a clutch spring 76 which has a stud 78 extending from one end thereof downwardly a distance greater than the extent of the drive teeth 74 of the drive member 72 so as to engage the openings 52 prior to the engagement thereof by the teeth 74. The convolution of the clutch spring 76 is such that the stud 78 will provide a friction driving force to the lower reel R2 through the brake plate 50 only to the extent that the reaction force on the stud 78 is less than the coefficient of friction between the clutch spring 76 and the drive member 72. The friction coefficient is selected so that the torque applied to the reel R2 will be just enough to take up the film F being projected without permitting slack to form.

Figure 4:
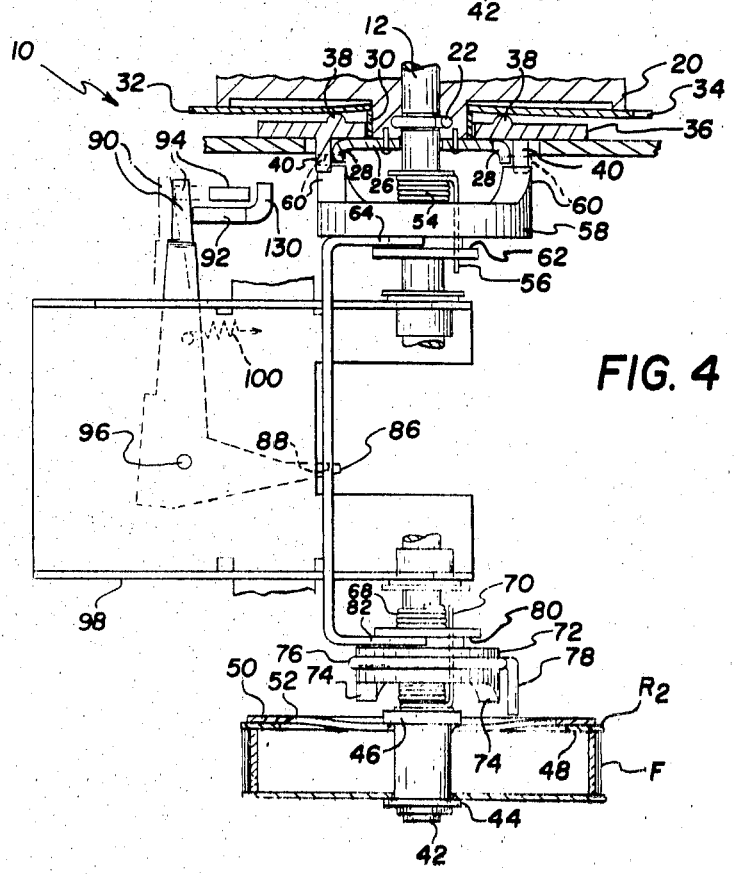
FIG. 4 is a side elevational view similar to that of FIG. 2 showing the operational elements in position to enable the projector to function in a reverse mode of operation (solid lines) or in a rewind mode of operation (phantom lines)

The axial position of the drive member engaging slide 66 will control the engagement of the upper drive member 58 or lower drive member 72 so as to place the drive mechanism 10 in a condition capable of operating the motion picture projector in either the forward, fast forward, reverse or rewind mode of operation. The location of the drive member engaging slide 66 is in turn controlled by a positioning lever 84 which has a first finger 86 extending through an opening 88 in the slide 66. The positioning lever 84 has a second finger 90 which is selectively engaged by a forward/reverse lever 92 or a slew lever 94 to regulate the vertical position of the first finger 86 by changing the angular orientation of the lever 84 about a pivot pin 96 mounted on a support frame 98. A coil spring 100 is connected between the positioning lever 84 and the frame 98 so as to bias the lever 84 toward its angular position wherein the slide 66 is in its lowermost position. The angular orientation of the positioning lever 84 with the resultant axial movement of the slide 66 for engagement of the upper reel drive member 58 or the lower reel drive member 72 may be seen in FIGS. 2–4, FIG. 2 representing the forward mode of operation, FIG. 3 representing the fast forward mode of operation and FIG. 4 representing the reverse mode of operation (full line view) or the rewind mode of operation (phantom position).

Projection Drive Control

In order to select the desired drive mode for the projector a control plate 102 is provided. The control plate 102 has a control knob 104 mounted on a shaft 108 connected to a slew positioning cam 110. The cam 110 has a lobe 112 which is adapted to be moved into engagement with a lobe 114 on an arm 116 of the slew lever 94. The lever 94 is mounted on a shaft 118 for pivoting movement thereabout resulting from the interaction of lobe 112 and lobe 114 so as to control the angular position of the slew lever 94. A spring 120 biases the arm 116 towards the cam 110 so as to maintain an engagement therebetween. The forward/reverse select knob 106 is mounted on a shaft 122 which is connected to an eccentric speed cam 124. The cam 124 is engaged with an arm 126 of the forward/reverse lever 92 which is also mounted on the shaft 118 for pivoting movement therebout. The arm 126 is biased toward engagement with the speed cam 124 by a spring 128.

The control knob 104 and the forward/reverse select knob 106 are rotated to establish the axial position of the upper and lower reel drives 58 and 72 to accomplish a forward, fast forward, reverse and rewind mode of operation as follows. To place the projector in a forward mode of operation, the forward/reverse select knob 106 is placed in the "forward" position as indicated on the control plate 102. In this position the speed cam 124 will establish a position of the forward/reverse lever 92 by interaction of the cam 124 and the arm 126 against the bias of spring 128. The control knob 104 is then placed in the "run" position as indicated on the control plate 102 with the resultant action that the lobe 112 will be disengaged from the lobe 114 of the slew lever 94 so that the lever 94 may pivot clockwise about the shaft 118 under the bias of the spring 120. The spring 100 will bias the positioning lever 84 about the pivot 96 so as to hold the second finger 90 against the forward/reverse lever 92 as shown in FIG. 2. With the positioning lever 84 thus located, the finger 86 will axially position the driver engaging slide 66 such that the upper reel drive 58 will be completely disengaged from the clutch teeth 28 of the upper reel drive plate 26 and the clutch teeth 40 of the grounding plate 36. Simultaneously, the lower reel drive 72 will be axiallly positioned such that the stud 78 of the clutch spring 76 engages an opening 52 in the lower reel brake plate 50 to provide a friction drive between the shaft 12 and the reel R2 only to the extent to wind up film F on the reel R2 without permitting slack. Thus, when the spindle shaft 12 is rotated by the gear 14 the take-up reel R2 will be subjected to a friction drive while the upper reel R1 will be permitted to free wheel, subject only to film weight-sensitive ground friction through the grounding plate 36.

To shift to the fast forward mode of operation, the control knob 104 is turned to its "fast forward" position as indicated on the control plate 102 bringing the lobe 112 into communication with the lobe 114 of the slew lever 94. The slew lever 94 will move into contact with an upwardly turned tab 130 of the forward/reverse lever 92 causing the lever 92 to move counterclockwise against the bias of the spring 128. With the levers 92 and 94 thus positioned, the positioning lever 84 is permitted to rotate clockwise about the pivot 96 under the urging of the spring 100 to the position shown in FIG. 3. In this position the driver engaging slide 66 moves the lower reel drive 72 downwardly so that the drive teeth 74 engage the openings 52 to provide a positive drive coupling between the spindle shaft 12 and the lower reel R2. The reel R2 may thus be rotated at the speed of the rotation of spindle shaft 12 and is not subject to the slipping associated with the friction drive provided by the clutch spring 76. In this mode of operation the upper reel R1 remains in its free-wheeling state with the upper drive 58 being maintained out of engagement with the upper reel drive plate 26 and grounding plate 36.

When it is desired to run the projector in the reverse mode of operation, the forward/reverse select knob 106 is turned to the "reverse" position as indicated on the control plate 102. In this position the eccentric cam 124 permits the arm 126 of the forward/reverse lever to be pivoted clockwise about the shaft 118 under the biasing of the spring 128. The positioning of the forward/reverse lever 92 in this manner will cause the lever 92 to engage the finger 90 of the positioning lever 84 to rotate the lever 84 counterclockwise about the pivot 96 to the position shown in full lines in FIG. 4. In this position, the positioning lever 84 will axially locate the driver engaging slide 66 such that the lower reel drive 72 will be completely disengaged from the reel R2 to permit the reel R2 to free wheel. Simultaneously, the upper reel drive 58 will be located such that the drive teeth 60 will engage the clutch teeth 40 of the grounding plate 36. The rotation of the spindle shaft 12 by the gear 14 will thus be transmitted through the upper reel drive 58 to the upper reel R1; this drive connection is a film weight-sensitive friction drive in that the connection between the reel R1 and the grounding plate 36 is by means of the upper reel support 20 which is supported by the upper reel support brake plate 32 which in turn rides on the friction pads 38 of the grounding plate 36.

To manually enter the rewind mode of operation, the control knob 104 is turned to its "rewind" position as indicated on the control plate 102. In this position the slew cam 110 will permit the slew lever 94 to be pivoted clockwise about the shaft 118 under the bias of the spring 120. The slew lever 94 will thus engage the finger 90 of the positioning lever 84 rotating the lever 84 in a counterclockwise direction about its pivot 96 to the position shown in phantom lines in FIG. 4. When the positioning lever 84 is in its phantom line position, the driver engaging slide 66 will be moved axially to the position wherein the drive teeth 60 of the upper reel drive 58 will engage the clutch teeth 28 of the upper reel drive plate 26. Such a driving connection provides a positive drive linkage between the spindle shaft 12 and the upper reel R1 to permit the reel R1 to be driven at full speed. This position of the driver engaging slide 66 maintains the lower reel drive 72 disengaged from the lower reel R2 to permit the reel R2 to free wheel.

The rewind mode of operation may also be entered automatically by the movement of a rewind slide 132 initiated by a snubber (not shown) depressed by the film passing from reel R1 to reel R2. Such an arrangement is shown and fully described in the aforementioned copending U.S. Pat. application Ser. No. 356,701, described herein only to the extent necessary for a complete understanding of the instant invention. The rewind slide 132 has a slot 134 through which an arm 136 of a rewind lever 138 extends. The rewind lever 138 is mounted on shaft 118 for pivotable movement thereabout. The rewind lever 138 has a second arm 140 which has a slot 142 therein. Extending into the slot 142 is a pin 144 which is connected to a switch cam plate 146 which in turn is integral with the slew cam 110. Thus, movement of the rewind slide 132 will pivot the rewind lever 138 counterclockwise about the shaft 118. This movement will cause the slot 142 to interact with the pin 144 rotating the shaft 108 to position the control knob 104 to indicate the "rewind"

mode of operation on the control plate 102 and further to position the slew cam 110 such that the slew cam 110 will engage the slew lever 94 to cause the lever to engage the finger 90 of the positioning lever 84 in the manner described above with reference to the manual entrance into the rewind mode of operation.

Brake Mechanism

Figure 7:
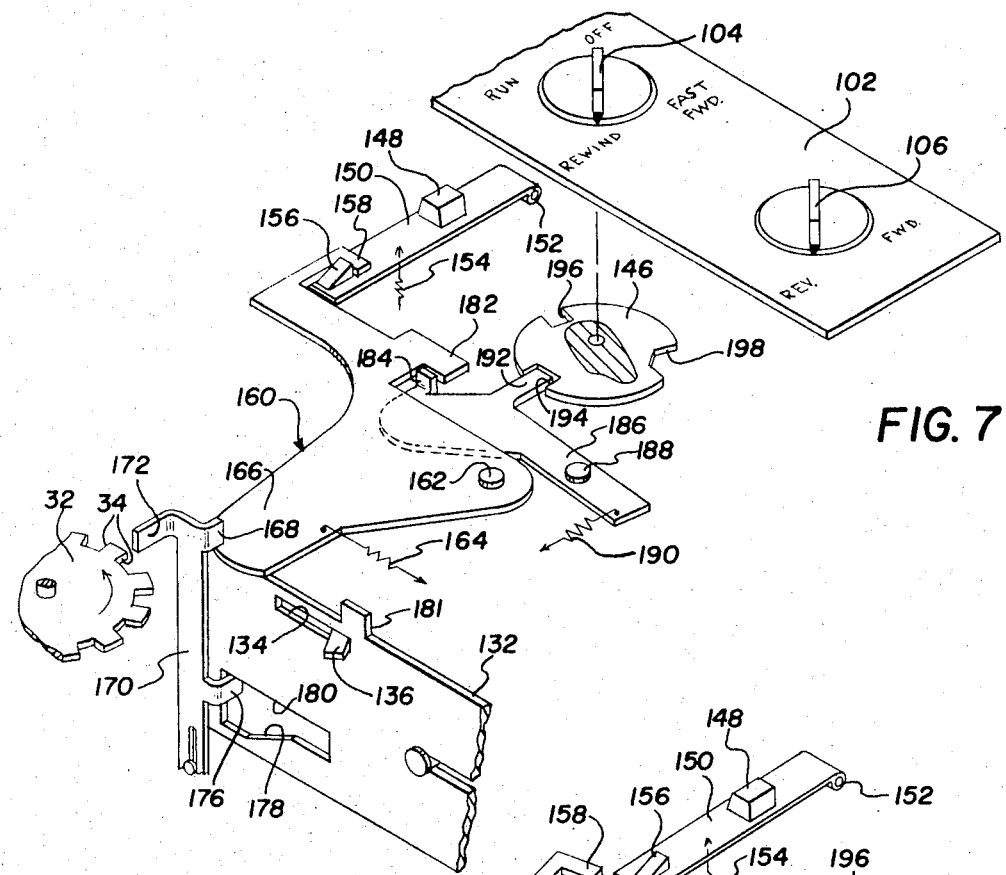
FIG. 7 is a perspective view of the braking mechanism similar to that of FIG. 6 showing the braking mechanism in its cocked position during the rewind mode of operation of the projector.
Figure 8:
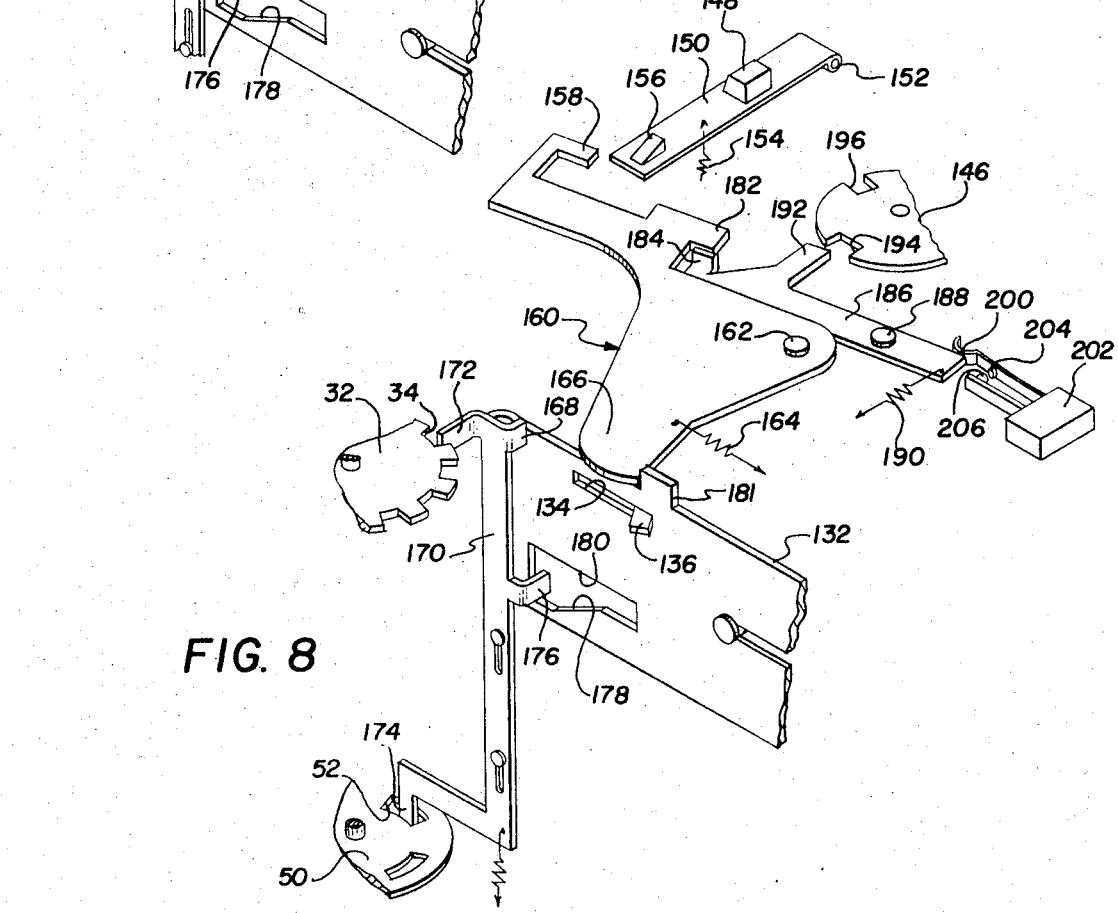
FIG. 8 is a perspective view similar to that of FIG. 6 of the braking mechanism in its operative position to stop rotation of the take-up and supply reels and to terminate the power in the projector.

Since, when in the rewind mode of operation, the control knob 104 is locked in position by the mechanism described below, in order to discontinue rewind a stop button 148 (see FIGS. 6 to 8) must be depressed. The stop button 148 is mounted on a lever 150 which is pivoted about the pivot pin 152. The lever 150 is biased toward a non-depressed position by means of the spring 154. On the end of the lever opposite the pivot 152 there is located a dog 156 which normally engages a first finger 158 of a brake release lever 160. The brake release lever 160 is mounted for pivotable movement on a pin 162 and is biased in a direction to rotate counterclockwise about the pin 162 by a spring 164. The brake release lever 160 has an arm 166 which is normally positionable under the finger 168 of a downwardly biased brake slide 170 when the finger 158 is engaged with the dog 156 (FIG. 6). The brake slide 170 has fingers 172 and 174 which are positioned to selectively engage the notches 34 on the upper reel support brake plate 32 and openings 52 on the lower reel brake plate 50 respectively when the slide 170 moves to its operative position (FIG. 8). Further, the brake slide 170 has a finger 176 which cooperates with a cam surface 178 of a slot 180 in the rewind slide 132. The cam surface 178 serves to permit recocking of the brake slide 170 when the rewind slide 132 is returned to its normal position. The rewind slide 132 also has a tab 181 which is engageable with the arm 166 of the brake release lever 160 to recock the brake release lever when the rewind slide 132 is returned to its normal operating position (see FIG. 6).

The brake release lever 160 has an additional finger 182 which engages a tab 184 of a switch lever 186. The switch lever 186 is mounted on a pivot pin 188 and is biased by a spring 190 for clockwise rotation about the pin 188. A finger 192 extends from the switch lever 186 to selectively engage square-sided notches 194 or 196 of the switch cam plate 146 or angled side edges of the notch 198 thereof. Thus, when knob 104 is in the "run" position (FIG. 6) the finger 192 will be engaged with the notch 198 so that the knob 104 can be moved to another operational mode indicating position. However, when the control knob 104 is in the "rewind" or "fast forward" indicating position, the switch cam plate 146 will be rotated so that the finger 192 will be engaged with the notch 194 or 196 respectively and rewind slide 132 will be moved to the position of FIG. 7. In this arrangement the discontinuance of the operational mode may only be accomplished by depressing the stop button 148 since the engagement of finger 192 with notch 194 or 196 will prevent rotation of the knob 104.

When the button 148 is depressed (see FIG. 8) the lever 150 will pivot about its pin 152 causing the dog 156 to release the finger 158 of the brake release lever 160. The brake release lever 160 will then be caused to pivot about its pin 162 by the spring 164 (such pivoting is possible because of the above noted movement of the rewind slide 132 to the position of FIG. 8 when the drive mechanism 10 is in the "rewind" or "fast forward" selection mode). Movement of the brake release lever 160 in this counterclockwise direction will cause the arm 166 thereof to release the finger 168 of the brake slide 170 so that the brake slide may move downwardly such that the fingers 172 and 174 thereof will respectively engage the notches 34 of the upper reel support brake plate 32 and the openings 52 of the lower reel brake plate 50 to stop the action of the respective upper and lower reels, R1 and R2. Simultaneously, the movement of the brake release lever 160 will cause the finger 182 thereof engaging the tab 184 to pivot the switch lever 186 about the pin 188 to remove the finger 192 from the square-sided notch of the switch cam plate 146 so that the control knob 104 may be reset to indicate a desired mode of operation. The pivoting of switch lever 186 also accomplishes the engagement of the lever with an arm 200 of a switch 202 which controls the power in the projector. The engagement of the lever 186 with the arm 200 will open the contacts 204, 206 of the switch 202 to accomplish interruption of the power in the projector.

The invention has been described in detail with particular reference to the preferred embodiment thereof, but it will be understood that variations and modifications can be effected within the spirit and scope of the invention.

I claim:

1. A drive mechanism for a motion picture projector for selectively effecting forward, reverse or rewind modes of operation, said drive mechanism comprising: an axially extending spindle shaft; drive means for rotating said spindle shaft in one direction; first support means for supporting a supply reel on said spindle shaft for operation in a first plane; second support means for supporting a take-up reel on said spindle shaft for operation in a second plane spaced from said first plane; first axially positionable clutch means movable relative to said drive means for selectively coupling said spindle shaft to said second support means for effecting a forward operational mode, said spindle shaft rotating in said one direction during said forward operational mode; second axially positionable clutch means movable relative to said drive means to a plurality of positions for selectively coupling said spindle shaft to said first support means for effecting a friction drive reverse operational mode in one position and a positive drive rewind operational mode in a different position, said spindle shaft rotating in said one direction during said reverse and rewind operational modes; and actuator means for axially positioning each of said clutch means for establishing the coupling of a particular clutch means to its appropriate support means dependent upon drive mode desired.

2. The apparatus of claim 1 wherein said actuator means includes a slide engaged with each of said clutch means, and means for controlling the actuation of said slide towards either said first support means or said second support means to effect a desired operational mode.

3. The apparatus of claim 1 further including a brake means for applying a positive braking action to said first and second support means when it is desired to interrupt the rewind operational mode.

4. The apparatus of claim 1 wherein said first clutch means includes a take-up reel drive member, a friction clutch connected to said drive member, said friction clutch being selectively engageable with said take-up reel to drive said reel, and said drive member having receiving means for connection to said actuator means.

5. The apparatus of claim 4 wherein said first support means comprises a supply reel support, a support drive member fixed to said supply reel support, a ground friction member, and an intermediate friction plate providing a frictional drive engagement between said ground friction member and said supply reel support.

6. The apparatus of claim 5 wherein said second clutch means includes a supply reel drive member, a series of clutch teeth extending from said drive member to selectively engage said support drive member or said ground friction member depending on the axial position of said drive member, and said drive member having receiving means for connection to said actuator means.

7. The apparatus of claim 6 wherein said actuator means includes a slide engaged with each of said drive member receiving means, a slide lever for axially positioning said slide towards either said second support means to establish a forward operational drive mode by engaging said friction clutch with said take-up reel and disengaging said friction clutch teeth of said second clutch means, or towards said first support means to establish a reverse operational drive mode by engaging said clutch teeth of said second clutch with said ground friction member and disengaging said friction clutch from said take-up reel, or to establish a rewind operational drive mode by engaging said clutch teeth of said second clutch with said support drive member and disengaging said friction clutch from said take-up reel.

8. A drive mechanism for a motion picture projector having a film supply reel and a film take-up reel, said drive mechanism comprising:
 a. a spindle shaft;
 b. unidirectional drive means for rotating said spindle shaft;
 c. a first film reel support for supporting a film supply reel, said first support mounted on said spindle shaft for rotation in a first plane at a fixed axial location on said shaft;
 d. a first drive plate fixed to said first film reel support, said drive plate having a series of clutch teeth extending therefrom;
 e. ground friction means engaging said first film reel support to establish a film-weight-sensitive friction coupling therewith;
 f. a first film reel support drive member selectively axially movable relative to said spindle shaft between a disengaged position and a position to engage said ground friction means or said first drive plate to establish a friction or positive drive mode respectively;
 g. a second film reel support for supporting a film take-up reel said second support mounted on said spindle shaft for rotation in a second plane at a fixed axial location on said shaft spaced from said first plane;
 h. a second drive plate providing a drive coupling between said film take-up reel and said second film reel support;
 i. friction drive means selectively engageable with said second drive plate for providing friction drive of said second film reel support;
 j. a second film reel support drive member selectively axially movable relative to said spindle shaft between a disengaged position and a position to engage said friction drive means or said second drive plate to establish a friction or positive drive mode respectively;
 k. means for axially positioning said first and second drive members to a selected position to establish a desired operational drive mode, said first film reel support drive member being disengaged when said second film reel support drive member is in either of its engaged positions and said second film reel support drive member being in its disengaged position when said first film reel support drive member is in either of its engaged positions; and
 l. brake means for selectively interrupting inertial drive of said supply and take-up film reels and interrupting power supply within said projector.

9. The apparatus of claim 8, wherein said means for axially positioning said drive members includes:
 a. a slide connected to each of said drive members to maintain an axial spacing therebetween;
 b. a first lever connected to said slide for controlling the axial position thereof between a first position where said first film reel support drive member is in its disengaged position and said second film reel support drive member is in its position to engage said friction drive means, a second position where said first drive member is disengaged and said second drive member is positioned to engage said second drive plate, a third position wherein said second drive member is disengaged and said first drive member is positioned to engage said ground friction means, or a fourth position wherein said second drive member is disengaged and said first drive member is positioned to engage said first drive plate;
 c. a second lever for selectively controlling said first lever to regulate the position thereof to its first or third position; and
 d. a third lever for selectively controlling said first lever to regulate the position thereof to its second or fourth position.

10. The apparatus of claim 8, wherein said brake means includes:
 a. a series of openings in said first drive plate;
 b. a series of openings in said second drive plate;
 c. a brake slide selectively positionable to engage an opening in each of said series of openings to accomplish a braking function on said first and second drive plates;
 d. a normally closed switch for controlling power in said projector;
 e. a switch actuator selectively positionable for opening said normally closed switch; and
 f. means for retaining said brake slide out of engagement with said openings in said first and second drive plates when said retaining means is in a first position, said retaining means being movable to a second position where said brake slide is free to move into engagement with said openings in said first and second drive plates and said switch actuator is moved to its switch opening position.

* * * * *